Patented Dec. 10, 1935

2,023,614

UNITED STATES PATENT OFFICE 2,023,614

PROCESS OF DYEING WITH AZO DYES AND CELLULOSIC MATERIAL DYED THEREWITH

William Galloway Reid, Manchester, England, assignor to Imperial Chemical Industries Limited, Westminster, England No Drawing. Application May 11, 1931, Serial No. 536,665. In Great Britain March 19, 1931

11 Claims. (Cl. 8—5)

This invention relates to the manufacture of dyed articles and it comprises processes of making such articles wherein the material to be dyed is impregnated with a diacylacetyldiamino compound and the impregnated material is treated with a diazotized aminoaryleneaminoanthraquinone compound; and it further comprises dyed materials having green shades obtained by the formation of the dye in situ; all as more fully hereinafter set forth and as claimed.

It is known that yellow, orange and brown water-insoluble azo dyes and dyeings on vegetable fibers may be obtained by combining, in substance or on the fiber, a diazotized amine and a diacylacetyldiamino compound (compare Patent No. 1,505,569), but hues other than those ranging from yellow to brown, have not heretofore been produced.

I have now discovered means by which such other hues or shades, particularly green shades, may be obtained.

By my present process I can produce green dyeings on textiles by the so-called "ice color" process; the dyeings being of satisfactory fastness. Also I may produce a green water-insoluble dyestuff in substance.

In my process, I obtain these green water insoluble dyes by reacting a diacylacetyldiamino compound with a diazotized aminoaryleneaminoanthraquinone compound. The diacylacetyldiamino compound may be represented by the probable formula:

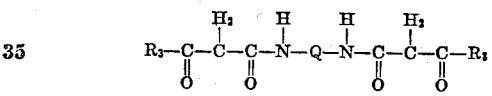

wherein $R_3$ represents a hydrocarbon radical and Q represents a structure of the class consisting of —R—, —R—R—, and —R—X—R—, wherein R represents a para-arylene nucleus and X represents a connecting linkage. $R_3$ may be hydrocarbon radical such as alkyl groups (methyl, ethyl, etc.) or benzene nucleus (phenyl). The connecting linkage represented by X may be a linkage of the class consisting of

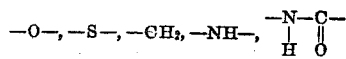

and

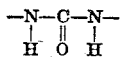

Also the linkage represented by X may be a direct linkage between the arylene nuclei giving the structure represented above as —R—R—. I have found that compounds containing this direct linkage between the arylene nuclei, are advantageous both in my process and in the products produced. For instance, compounds represented by the following formula:

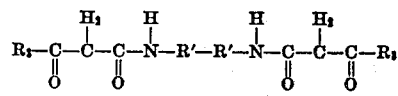

wherein R' represents a para-phenylene nucleus and $R_3$ represents an alkyl or benzene nucleus, are advantageous.

The para-phenylene nuclei in the above formulas may have substituted thereon groups such as the alkyl group, but should be free from salt-forming groups.

The aminoaryleneaminoanthraquinone compounds may be represented by the following formula:

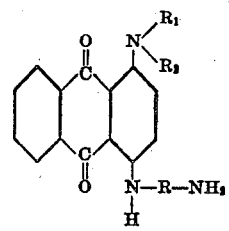

wherein $R_1$ represents an alkyl group, an aralkyl or aryl nucleus, $R_2$ represents hydrogen, an alkyl group, an aralkyl or benzene nucleus, and in which $R_1$ and $R_2$ may be cross linked to form a polymethylene ring and R represents a para-arylene nucleus. I find that such anthraquinone compound as may be represented by the following formula:

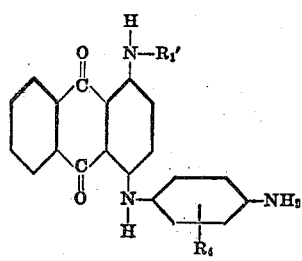

wherein $R_1'$ represents an alkyl group and $R_4$ represents hydrogen, chlorine, an alkyl or alkoxy group, are advantageous. This anthraquinone derivative should be free from acid or additional free amino groups.

The new azo dyestuffs obtained by my processes may be represented by the following generic formula:

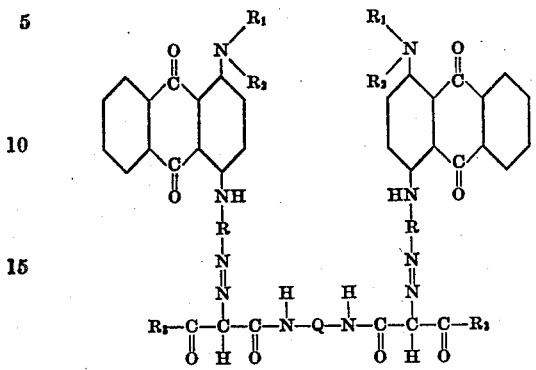

wherein the various symbols have the same significance as heretofore generically set forth. Within this generic class there are many sub-generic classes, a few of which are represented by the following structural formulæ:

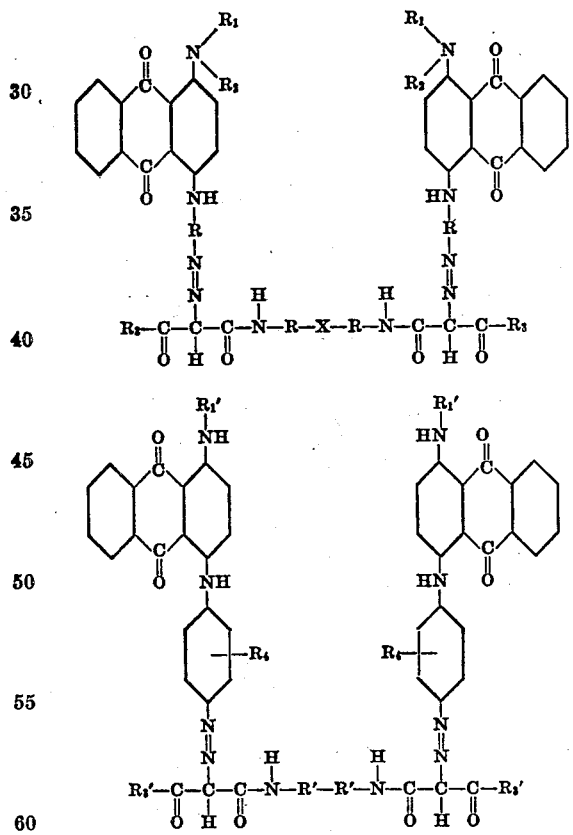

wherein $R_1'$ represents an alkyl group, $R_3'$ represents an alkyl group or benzene nucleus, $R'$ represents a para-phenylene nucleus and $R_4$ represents hydrogen, chlorine, an alkyl or an alkoxy group. Preferably they are produced directly on the fibre by the general methods customary in the so-called "ice-color" process. The dyeings so obtained, in accordance with the invention, are distinguished by pure green shades. They have outstanding fastness to washing and treatment with alkalis, as is shown when the kier-boiling test described below is applied. The dyeings also have very good light fastness and are fast also to perspiration and rubbing.

In order better to disclose the invention I give several specific embodiments thereof below. It is to be understood that these examples are purely illustrative and that the invention is in no way limited thereto.

*Example 1.*—Cotton yarn is impregnated by working for 30 minutes at 30° C. in a solution containing 3 grams per litre of diacetoacetyl-o-tolidide with the addition of 14 grams per litre of common salt, squeezed and passed into a diazo solution obtained as described below, diluted with water until there are 4 parts of diazonium compound in 1000 parts of solution. The yarn is immediately dyed green. The dyed yarn is rinsed and finally soaped for ½ hour at the boil in a bath containing 3 grams soap and 2 grams soda ash per litre. A bright green shade of great fastness to washing kier-boiling, etc., is produced.

The diazo solution is obtained by dissolving 34.3 parts of 1-methylamino-4-p-aminoanilino-anthraquinone

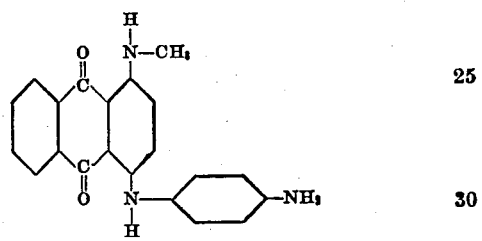

in 200 parts of sulphuric acid of 96 per cent strength, adding 600 parts of ice and 6.9 parts of sodium nitrite dissolved in 50 parts of water. When all the nitrite is introduced, water is added until all the diazonium salt is dissolved, a deep green solution being obtained. The parts above are by weight.

*Example 2.*—A diazonium solution is prepared in the manner described in the preceding example and is filtered if necessary. It is run into a solution of 20 parts of diacetoacetyl-o-tolidide in 1000 parts of water containing 8 parts of sodium hydroxide, all the parts being by weight. The mixture is stirred overnight, then heated to 90° C. and the precipitated insoluble dyestuff filtered and well washed with cold water. When dry it forms a dark green or black powder dissolving in concentrated sulphuric acid to give a bright green solution, which on addition of water becomes olive green and gives an olive green precipitate. The dyestuff is sparingly soluble in benzene to a clear green solution. The dyestuff gives a green lake pigment when mixed with or prepared in presence of the usual substrata.

*Example 3.*—Cotton yarn is impregnated as described in Example 1. It is then passed into a diazo solution containing a diazonium compound prepared as described in Example 1 from the compound

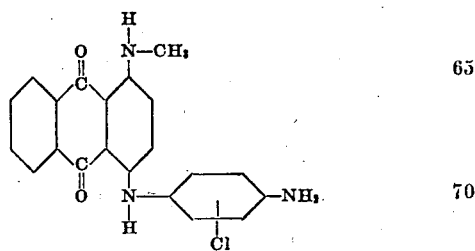

(obtained according to the method referred to below by use of 2-chloro-p-phenylenediamine instead of p-phenylenediamine). A similar bright green shade is produced and the washing and other fastness properties are alike excellent.

Similar dyeings are obtained when there are used as parents of the diazonium compound the compounds represented by the following formulæ:—

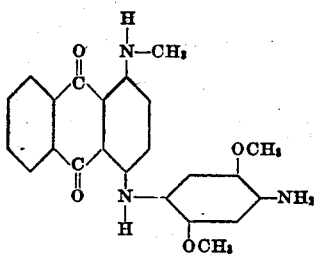

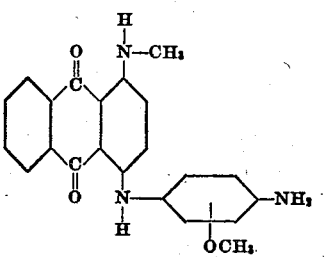

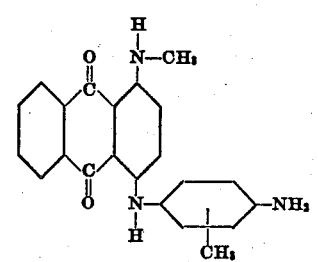

these compounds being producible by the method described in British Specification No. 315,905.

Other compounds, for instance, those represented by the formulæ:

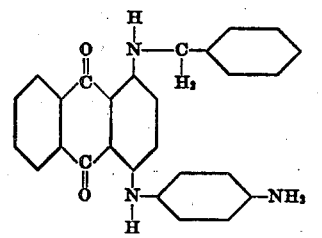

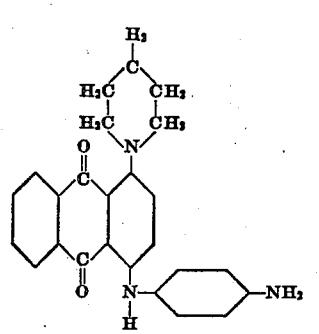

may also be used.

Likewise there may be used also as coupling components instead of diacetoacetyl-o-tolidide diacetoacetyl-4:4'-diaminobenzophenone diacetoacetyl-4:4'-diaminodiphenylurea, diaceto- toacetyl-4:4'-diaminodiphenylmethene, dibenzoylacetyl-o-tolidide and the like.

That the dyeings obtained in accordance with the invention exhibit outstanding fastness to kier-boiling is shown when the test described by Rowe (cf. Journal of the Society of Dyers and Colourists, 1931, (February) page 33) is applied. The test is as follows:

One 5 gram skein of dyed cotton was plaited with one 5 gram skein of bleached cotton yarn and boiled for six hours in 100 cc. distilled water to which 0.8 cc. 73° Tw. caustic soda solution had been added (i. e. 100 cc. of 0.36 per cent caustic soda solution). Loss of water by evaporation is continually made up by dropping in boiling water. The plait is removed, rinsed thoroughly in running water, and dried.

The fibre may also be dyed in the novel way by printing a diazo solution upon a padded fabric in the usual manner. The azo compounds and processes for their production heretofore described are described and claimed in a copending application Serial No. 644,277, filed November 25, 1932.

Now what I claim and desire to secure by Letters Patent is the following:—

1. In the manufacture of dyed cellulosic materials having green shades, the process which comprises impregnating the cellulosic material with a diacylacetyldiamino compound having the probable formula

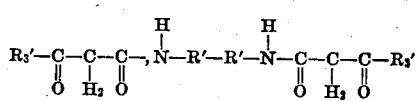

wherein $R_3'$ represents an alkyl group or benzene nucleus and $R'$ represents a paraphenylene nucleus, and then treating the impregnated material with a diazotized aminophenyleneaminoanthraquinone compound having the probable formula

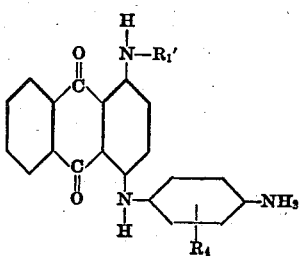

wherein $R_1'$ represents an alkyl group and $R_4$ represents hydrogen, chlorine, an alkyl or alkoxy group.

2. The process of claim 1 in which said diacylacetyldiamino compound is diacetoacetyl-o-tolidide.

3. The process of claim 1 in which said aminophenyleneaminoanthraquinone compound is 1-methylamino-4-para-aminoanilinoanthraquinone.

4. In the manufacture of dyed cellulosic materials having green shades, the process which comprises impregnating the cellulosic material with a diacylacetyldiamino compound of the class consisting of diacetoacetyl-o-tolidide, diacetoacetyl-4:4'-diaminobenzophenone, diacetoacetyl-4-4'-diaminodiphenylurea, diacetoacetyl-4:4'-diaminodiphenylmethane and dibenzoylacetyl-o-tolidide, and then treating the impregnated material with a diazotized 1-substituted amino-4-aminoanilinoanthraquinone.

5. Cellulosic materials dyed with a water-insoluble dye developed in situ, said dye having the following general formula:

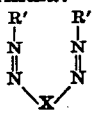

wherein R' represents the residue of a diazotized amino-arylene-amino-anthraquinone compound, and X represents the residue of a diacyl-acetyl-diamino compound wherein the acyl-acetyl groups are substituted on separate amino groups.

6. Cellulosic materials dyed in green shades by means of a water insoluble dye developed in situ, said dyestuff having the probable formula

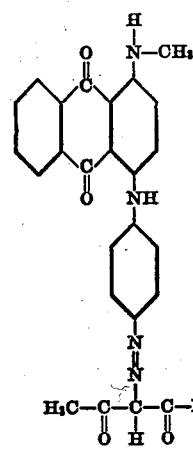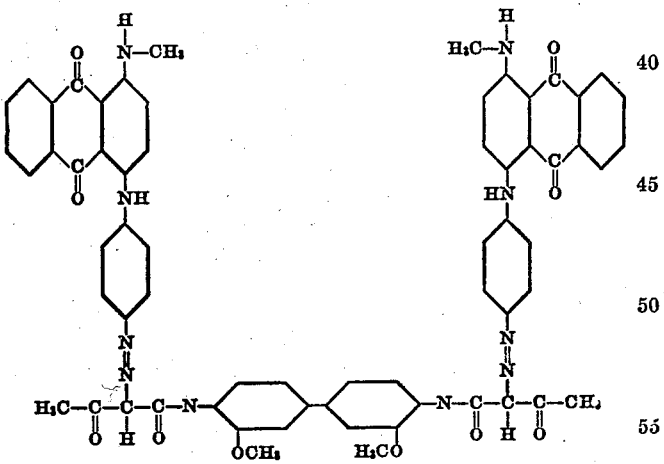

wherein $R_1'$ represents an alkyl group or benzyl group and $R_3'$ represents an alkyl or phenyl group and R' represents a paraphenylene nucleus.

7. Cellulosic materials dyed in green shades by means of a water insoluble dye developed in situ, said dyestuffs having the probable formula

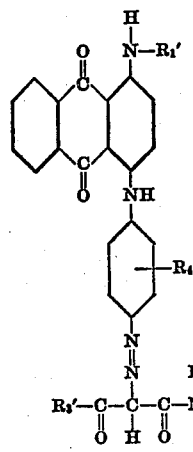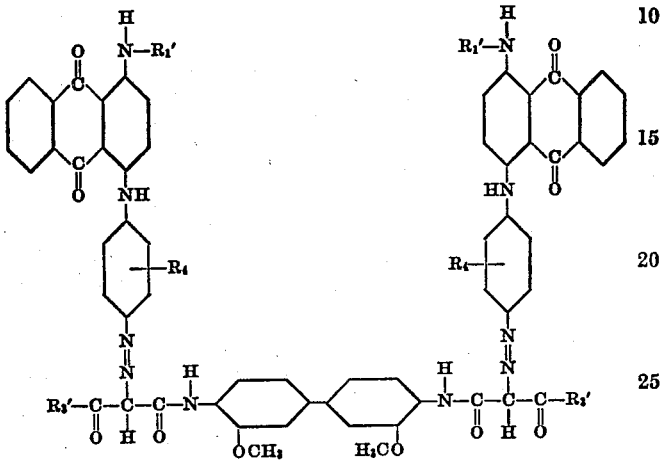

wherein $R_1'$ represents an alkyl group, $R_3'$ represents an alkyl or phenyl group, $R_4$ represents hydrogen, chlorine, or alkoxy group.

8. Cellulosic materials dyed in green shades by means of a water insoluble dye developed in situ, said dyestuffs having the probable formula

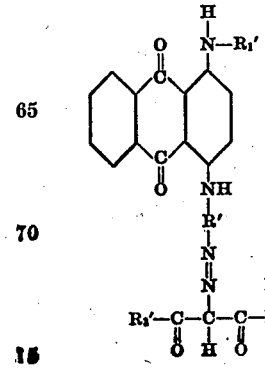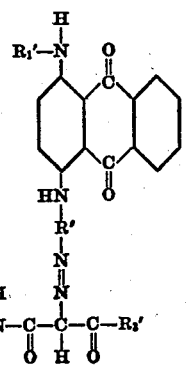

9. A process of producing on the fibre of cotton goods, azo dyestuffs insoluble in water, which consists in treating the cotton goods, after impregnation with diacetoacetyl-o-tolidide, with a diazotized 1-methyl-amino-4-p-aminoanilinoanthraquinone.

10. Cellulosic materials dyed in green shades by means of a water insoluble dye developed in situ, said dyestuff having the probable formula:

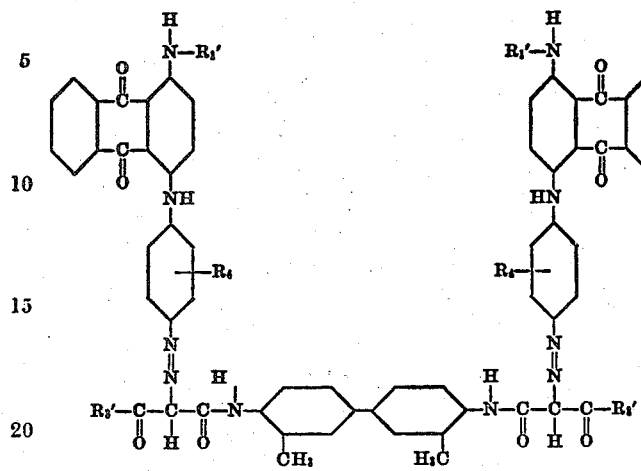

wherein $R_1'$ represents an alkyl group, $R_3'$ represents an alkyl or phenyl group, and $R_4$ represents hydrogen, chlorine, or alkoxy group.

11. Cellulosic materials dyed in green shades by means of a water insoluble dye developed in situ, said dyestuff having the probable formula:

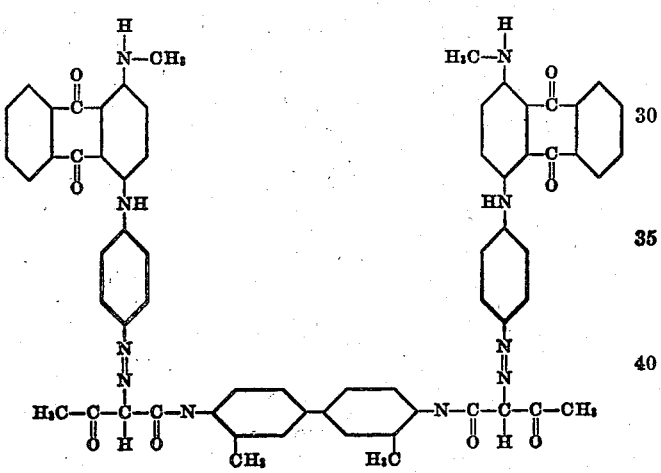

WILLIAM GALLOWAY REID.